(12) United States Patent
Lee

(10) Patent No.: US 7,658,080 B2
(45) Date of Patent: Feb. 9, 2010

(54) METHOD OF CONTROLLING AIR CONDITIONER FOR VEHICLES

(75) Inventor: Jeong-Hoon Lee, Seoul (KR)

(73) Assignee: Halla Climate Control Corp., Daejeon-si (KR)

( * ) Notice: Subject to any disclaimer, the term of this patent is extended or adjusted under 35 U.S.C. 154(b) by 394 days.

(21) Appl. No.: 11/253,797

(22) Filed: Oct. 20, 2005

(65) Prior Publication Data
US 2006/0088424 A1 Apr. 27, 2006

(30) Foreign Application Priority Data
Oct. 21, 2004 (KR) ................. 10-2004-0084276
Oct. 13, 2005 (KR) ................. 10-2005-0096326

(51) Int. Cl.
*F25B 1/00* (2006.01)
*F25B 49/00* (2006.01)
*G05D 15/00* (2006.01)

(52) U.S. Cl. .................. 62/227; 62/228.1; 62/133; 236/78 D

(58) Field of Classification Search ............... 62/228.1, 62/228.3, 227, 229, 133; 236/78 D
See application file for complete search history.

(56) References Cited

U.S. PATENT DOCUMENTS

| 5,088,298 A | 2/1992 | Fujii |
| 5,172,563 A | 12/1992 | Fujii |
| 6,038,871 A | 3/2000 | Gutierrez et al. |

FOREIGN PATENT DOCUMENTS

JP 2003200730 A * 7/2003

* cited by examiner

*Primary Examiner*—Chen-Wen Jiang
(74) *Attorney, Agent, or Firm*—Lowe Hauptman Ham & Berner LLP

(57) ABSTRACT

A vehicle air conditioner is controlled so a target control value of a pressure control valve controlling tilt angle of a swash-plate of a swash-plate type variable capacity compressor is variably controlled according to temperature deviation between target evaporator temperature and actual evaporator temperature, thereby controlling the compressor discharge capacity. Target heat discharge quantity is calculated. Target heat discharge quantity is calculated for high thermal load control or low thermal load control. The control value of the pressure control valve is compulsively controlled. Then the control value is normally controlled. The actual evaporator temperature can reach the target evaporator temperature at an initial operating stage, and temperature stability is secured.

17 Claims, 6 Drawing Sheets

METHOD OF CONTROLLING AIR CONDITIONER FOR VEHICLES

CLAIM FOR PRIORITY

The present application is based on, and claims priority from, Korean Application Serial Number 10-2004-0084276, filed Oct. 21, 2004, and Korean Application Serial No. 10-2005-0096326, filed Oct. 13, 2005, the disclosure of both are hereby incorporated by reference herein in their entirety.

TECHNICAL FIELD

The present invention relates to a method of controlling air conditioner for vehicles, and more specifically to a method of controlling air conditioner for vehicles, wherein the target control value of the pressure control valve which controls tilt angle of a swash-plate of a swash-plate type variable capacity compressor is variably controlled according to the temperature deviation between target evaporator temperature and actual evaporator temperature, thereby efficiently controlling the discharge capacity of the compressor.

BACKGROUND ART

In a typical swash-plate type variable capacity compressor, the tilt angle of a swash-plate can be controlled by the change in the pressure of the refrigerant which is controlled by the pressure control valve depending on the thermal load. By controlling the tilt angle of a swash-plate, the stroke distance of the piston is changed thereby changing the discharge capacity of refrigerant and thus controlling the temperature of an evaporator.

The pressure control valve can be either internal-controlling type or external-controlling type, and a typical structure of swash-plate type variable capacity compressor is disclosed in Japanese laid open patent application No. 2001-107854.

In vehicles having an air conditioner equipped with the swash-plate type variable capacity compressor as described above, the air conditioner should operate properly at the initial stage of the operation depending on the deviation between the target evaporator temperature and an actual evaporator temperature. For example, the discharge capacity of the compressor should be controlled so that the evaporator temperature reaches the target temperature, to keep passengers from being uncomfortable and prevent the occurrence of loud noise.

Japanese laid open patent application No. 2003-200730 discloses a method of controlling an air conditioner wherein proportional-integral control is carried out on the discharge capacity of the compressor by setting the control value (duty) of the pressure control valve depending on the deviation between the target evaporator temperature and actual evaporator temperature.

This technique has an advantage of making evaporator temperature drop quickly. However, when the initial value of the pressure control valve and the actual evaporator temperature are higher than the target temperature, considering the actual evaporator temperature is high at the initial stage of operation, the controlled current value of the pressure control valve should be further increased in order to fully decrease the actual evaporator temperature. Thus, excessive undershoot of the evaporator temperature may occur and it takes a considerable time for the current value to decrease and converge to stabilization.

Japanese laid open patent application No. 2002-327686 discloses a method in which the capacity of the pressure control valve becomes increasingly larger from its minimum value during operation of the air conditioner.

In this method, the discharge capacity of the compressor is slowly increased from its minimum value, preventing operational shock and making passenger comfortable and improving the problem of noise. This method, however, has a problem of taking a long time for stabilization to reach the target evaporator temperature.

Also, the prior art methods described above can cause a problem of deteriorating convergence to reach the target evaporator temperature and thus cause instability since the capacity of the pressure control valve is fixedly controlled regardless of the variable need for high thermal load control or low thermal load control on the compressor.

DISCLOSURE OF THE INVENTION

One object of the invention is to provide a method of controlling an air conditioner for a vehicle wherein the target control value of the pressure control valve which controls tilt angle of a swash-plate of a swash-plate type variable capacity compressor is variably controlled according to the temperature deviation between target evaporator temperature and actual evaporator temperature, thereby efficiently controlling the discharge capacity of the compressor.

Another object of the invention is to provide a method of controlling a vehicle air conditioner by which the evaporator temperature can reach a target evaporator temperature quickly without fluctuation by compulsively controlling the target control value of the pressure control valve firstly, and then normally controlling the control value secondly.

In order to accomplish the objects of the present invention, the method of controlling air conditioner for vehicles according to a preferred embodiment of the present invention comprises the steps of calculating a target heat discharge quantity; determining whether the high thermal load control or low thermal load control is to be employed based on the calculated target heat discharge quantity; and initially compulsively controlling the control value of the pressure control valve of swash-plate type variable capacity compressor according to the amount of the thermal load, and then normally controlling the control value.

According to the present invention, in the compulsive control mode, and in the case of high thermal load control, the control value is preferably set to a maximum value initially and decreases at a constant rate thereafter.

The maximum value is preferably 100 to 70%.

After setting the control value to a maximum value, the control value is preferably maintained for predetermined time compulsively and, thereafter, is decreased at a constant rate when the deviation between the target evaporator temperature and actual evaporator temperature is no larger than a predetermined value in the compulsive control mode. The time when the normal control mode begins, after said compulsive control mode, is preferably the time when the absolute value of the deviation between the target evaporator temperature and the actual evaporator temperature is not larger than a predetermined value.

According to the present invention, in the compulsive control mode, and in the case of low thermal load control, the control value is preferably set to a minimum value and maintained for predetermined time. The minimum value is preferably 0 to 40%.

The normal control mode of the pressure control valve is preferably carried out through proportional-integral (PI) control or proportional-integral-differential (PID) control.

The normal control mode is preferably carried out by controlling the control value by variably setting control coefficients according to the amount of thermal load. The control coefficients are preferably set to have a value proportional to the absolute value of the deviation between the target evaporator temperature and the actual evaporator temperature. The control coefficients are preferably set to a maximum value when the absolute value of said temperature deviation is larger than the predetermined value.

The step of calculating target evaporator temperature preferably comprises: setting a target interior temperature of a vehicle by a user, detecting and inputting interior and exterior temperatures of the vehicle and solar radiation by using sensors installed at predetermined positions of the vehicle, calculating a target discharge temperature of a vent of the vehicle air conditioning casing by using the target interior temperature, interior and exterior temperature of the vehicle and solar radiation, inputting the maximum evaporator temperature, and calculating target evaporator temperature by comparing the target discharge temperature with the maximum evaporator temperature.

The step of inputting the maximum evaporator temperature preferably comprises calculating and inputting the maximum evaporator temperature depending on the temperature of the air flowing into the evaporator at the minimum operation of the compressor.

In the step of comparing target evaporator temperature with maximum evaporator temperature, the target evaporator temperature is preferably set to the target discharge temperature when the target discharge temperature of the vent is lower than the maximum evaporator temperature, and the target evaporator temperature is set to the maximum evaporator temperature when the target discharge temperature is higher than the maximum evaporator temperature.

The method can further comprise a step of calculating a target discharge temperature of the vent after the step of inputting interior and exterior temperature of the vehicle and solar radiation by using sensors installed on the predetermined positions of the vehicle.

The step of calculating the target heat discharge quantity of the vent is preferably carried out by calculating it according to the target interior temperature of a vehicle set by a user, interior and exterior temperature of the vehicle and solar radiation input from the sensors installed on the predetermined positions of the vehicle.

In the case of low thermal load control, the method preferably includes the steps of setting said control value to a minimum value, measuring the temperature of the cooling water, determining whether the temperature of the cooling water is not higher than predetermined temperature, and when the temperature of the cooling water is not higher than a predetermined temperature, the opening rate of the temperature control door is set to a maximum heating position.

DESCRIPTION ON THE NUMERALS OF DRAWINGS

Figure 1:
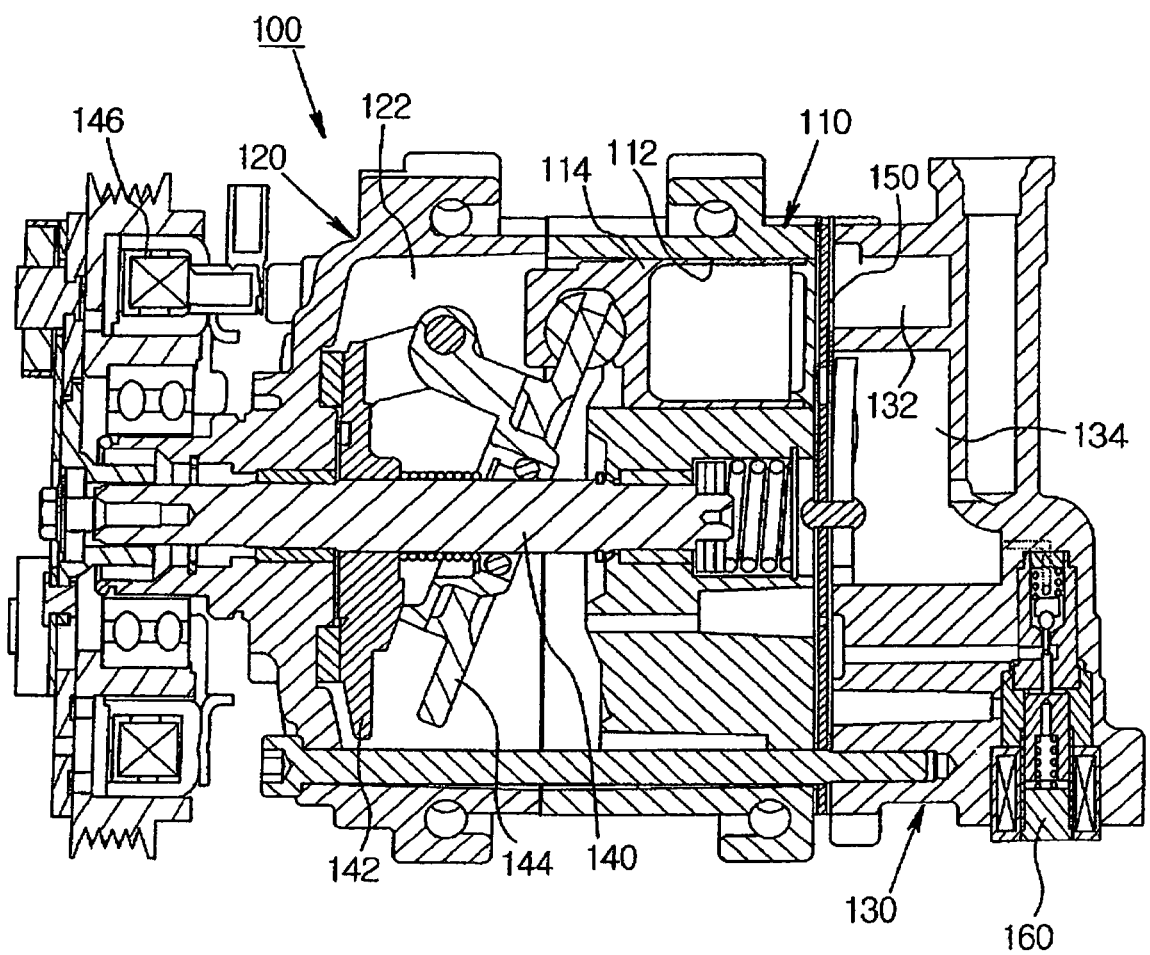
FIG. 1 is a cross-sectional view of one example of swash-plate type variable capacity compressor.

100: swash-plate type variable capacity compressor
160: pressure control valve
240: temperature control door
300: control unit
320: evaporator temperature sensor
330: exterior temperature sensor
340: interior temperature sensor
350: solar radiation sensor
360: cooling water temperature sensor

DETAILED DESCRIPTION OF THE DRAWINGS

The features and advantages of a preferred embodiment of the present invention will now be described in detail with reference to the attached drawings in order to specifically clarify the invention. It should be appreciated that the terms and expressions used in the specification and drawing should be interpreted to comply with the technical ideas of the present invention under the principle that inventors can properly define concepts of terms to explain his invention best.

FIG. 1 is an illustration of one example of a swash-plate type variable capacity compressor 100.

The swash-plate type variable capacity compressor 100, as illustrated in FIG. 1, comprises: a cylinder block 110 in which a plurality of cylinder bores 112 are formed in the radial direction along the coaxial circle; a plurality of pistons 114 are inserted between the cylinder block 110 and cylinder bores 112; a front housing 120 which is connected to the front side of the cylinder block 110 and which forms a crank chamber 122 in it; a rear housing 130 which is connected to the rear side of the cylinder block 110 and which forms a refrigerant suction chamber 132 and refrigerant discharging chamber 134 in the chamber; a driving shaft 140 supported across the cylinder block 110; a rotor 142 which rotates with the driving shaft 140 in the crank chamber 122; a swash-plate 144 which is movably installed around the driving shaft 140 and connected in the edge to the piston 114 in order to move the piston 114 in forward and backward directions and hinge-connected to one side of the edge to the rotor 142; a valve unit 150 which is interpositioned between the cylinder block 110 and rear housing 130 and which sucks refrigerant from the refrigerant suction chamber 132 to the cylinder bore 112 and discharges compressed refrigerant from the cylinder bores 112 to the refrigerant discharging chamber 134; an externally controlled pressure control valve 160 which is installed on the rear housing 130 in order to control the tilt angle of the swash-plate 144 against the driving shaft 140 by controlling the opening rate of the refrigerant returning passage connecting the refrigerant discharging chamber 134 to the crank chamber 122.

In the swash-plate type variable capacity compressor 100 as described above, a plurality of pistons 114 move in forward and backward directions sequentially by the wobbling rotation of the swash-plate 144. When the piston 114 moves backward from the cylinder bore 112 (suction stroke), the suction side of the valve unit 150 is opened due to the decrease in pressure in the cylinder bore 112 which connects the cylinder bore 112 to the suction chamber and, thus, refrigerant is sucked from the suction chamber to the cylinder bore 112. When the piston 114 moves forward to the cylinder bore 112 (compression stroke), the refrigerant sucked to the cylinder bore 112 is compressed due to the increase in pressure in the cylinder bore 112 and the discharge side of the valve unit 150 is opened to connect the cylinder bore 112 to the refrigerant discharging chamber 134 and, thus, the compressed refrigerant is discharged from the cylinder bore 112 to the refrigerant discharge chamber 134. The pressure control valve 160 controls the tilt angle of the swash-plate 144 by controlling the opening rate of the refrigerant returning passage connecting the refrigerant discharge chamber 134 to the crank chamber 122 according to the magnitude of thermal load and, thus, controls the discharge capacity of the refrigerant. As the tilting angle of the swash-plate 144 against the driving shaft 140 becomes acute, the discharge capacity of the refrigerant increases due to the increase of the stroke distance of the piston 114.

Figure 2:
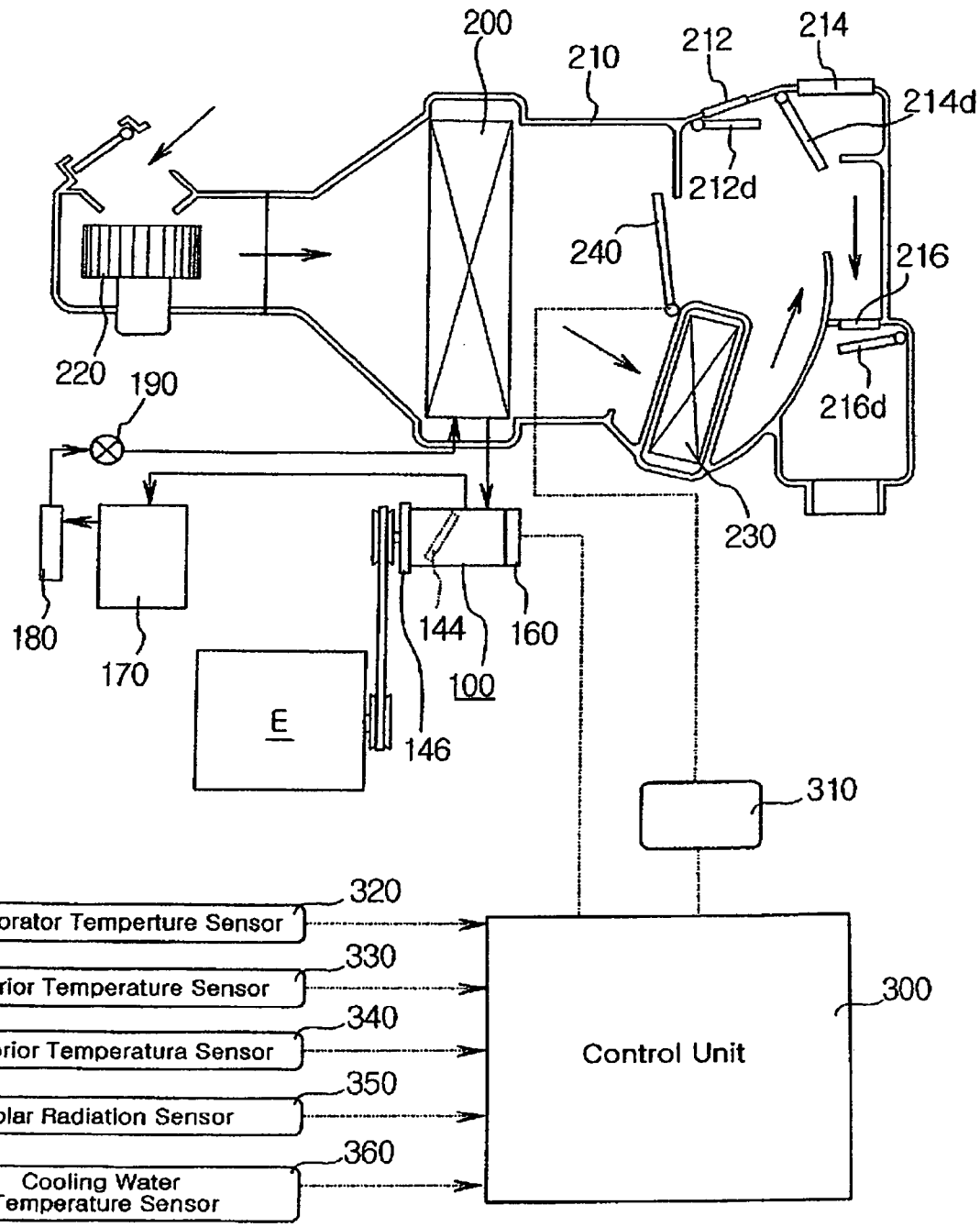
FIG. 2 is a diagram of a structure of an air conditioner for preferably carrying out the controlling method of the present invention.

FIG. 2 is an illustration of an air conditioner for vehicles equipped with the swash-plate type variable capacity compressor 100 as described above.

The air conditioner, as illustrated in FIG. 2, comprises an air conditioner case 210, a blower 220 installed on the entrance of the air conditioner case 210, an evaporator 200 and heater core 230 built in the air conditioner case 210, a temperature control door 240 which controls the opening rate of the passage of cooled and heated air passing through the evaporator 200, a swash-plate type variable capacity compressor 100 which sucks refrigerant from the evaporator 200 and discharges it, a condenser 170 which condenses and discharges the refrigerant supplied from the compressor 100, a receiver dryer 180 which separates the refrigerant supplied from the condenser 170 into gas and liquid, an expansion valve 190 which throttles the refrigerant supplied from the receiver dryer 180 and sends the refrigerant to the evaporator 200. The reference numerals 212d, 214d, 216d represent control doors which control corresponding vents 212, 214, 216.

The electronic clutch 146 which transfers the power of the engine to the compressor 100, the pressure control valve 160 which controls the discharge capacity of the compressor by controlling tilt angle of the swash-plate 144 and the actuator 310 which controls opening rate of the temperature control door 240 are controlled by the control unit 300. More specifically, the control unit 300 supplies or cuts power to the electronic clutch 146, controls the output current value on the actuator 310 so that the temperature control door 240 turns to open the air passage toward the heater core 230 or to detour the passage, and controls the output current value to the pressure control valve 160 in order to change the tilt angle of the swash-plate 144 so that the discharge capacity of the refrigerant increases or decreases.

In FIG. 2, numeral 320 represents an evaporator temperature sensor, 330 an exterior temperature sensor, 340 an interior temperature sensor, 350 a solar radiation sensor and 360 a cooling water temperature sensor, and the signals detected by these sensors are supplied to the control unit 300.

In the following, the method of controlling air conditioner for vehicles according to the preferred embodiment of the present invention is described.

Figure 3:
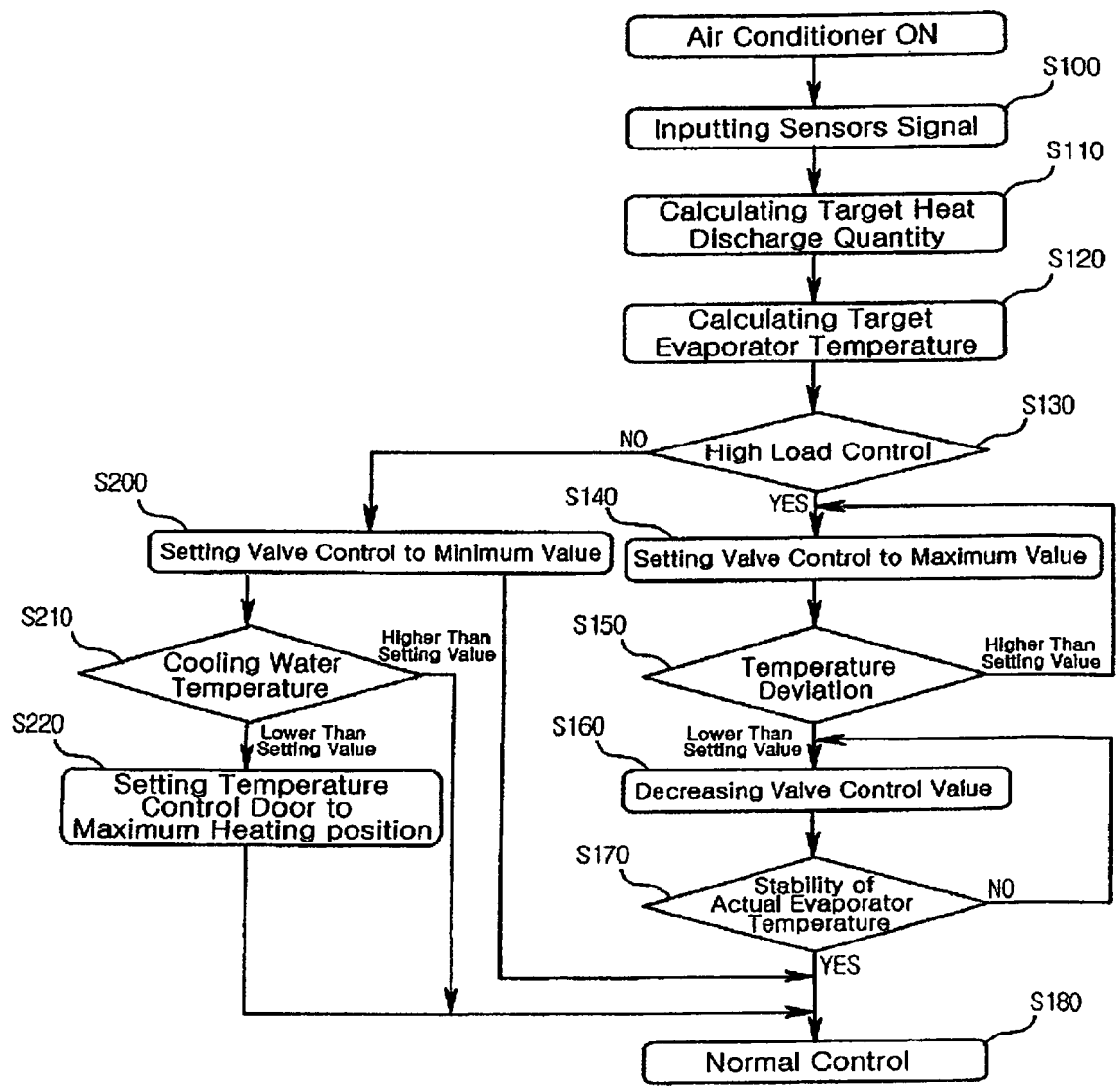
FIG. 3 is a flow chart of the method of controlling an air conditioner for vehicles according to a preferred embodiment of the present invention.

As shown in FIG. 3, when air conditioner is ON (S100), various signals detected by the evaporator temperature sensor 320, the exterior temperature sensor 330, the interior temperature sensor 340, the solar radiation sensor 350 and the cooling water temperature sensor 360 are supplied to the control unit 300 (S100).

Then target heat discharge quantity of the vent is calculated by the control unit 300 (S110).

The target heat discharge quantity of the vent can be calculated by using the target interior temperature input by the user, interior and exterior temperature of the vehicle and solar radiation detected by the sensors 330, 340, 350 installed on the predetermined positions of the vehicle.

Then, target evaporator temperature is calculated by the control unit 300 (S120).

Figure 4:
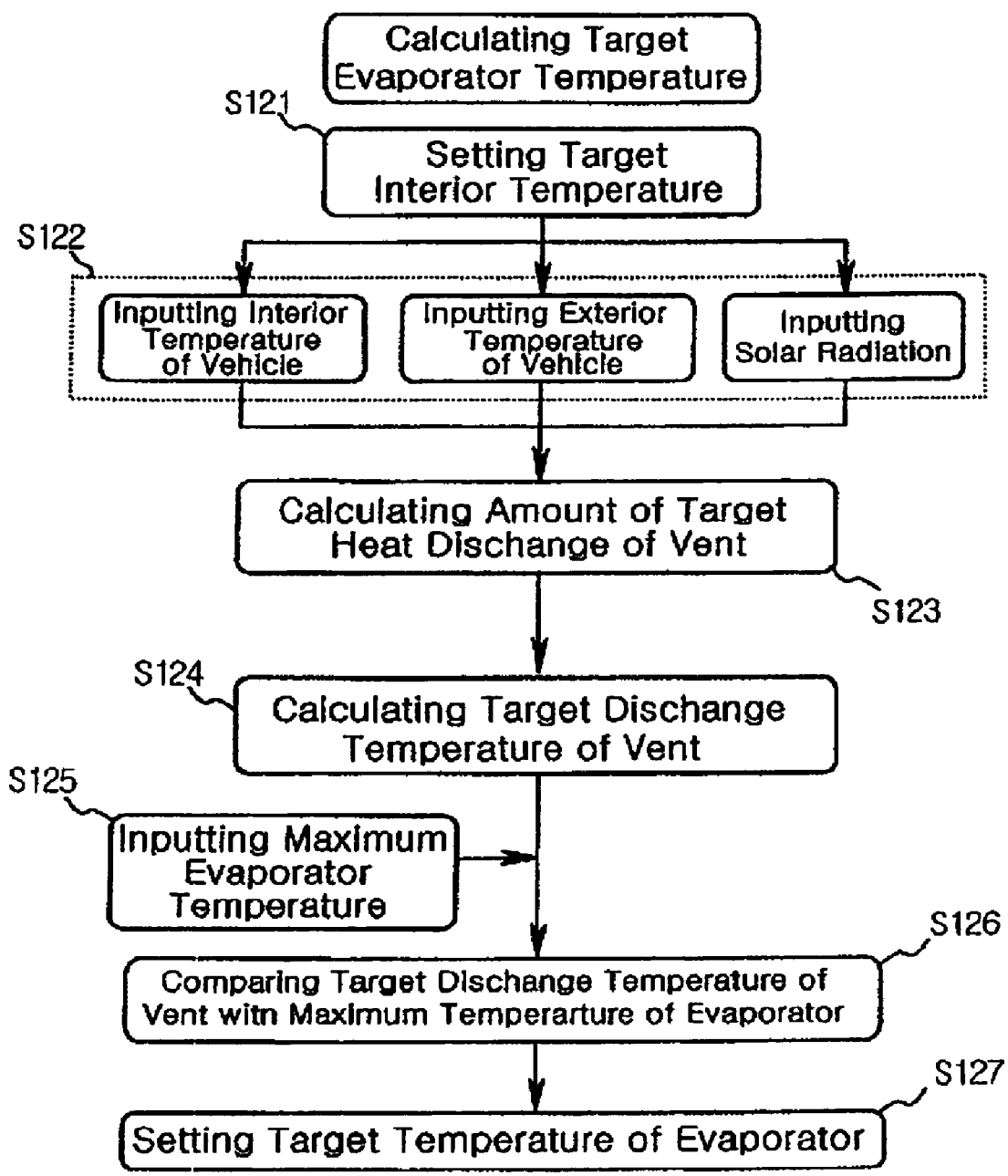
FIG. 4 is a flow chart of the step of setting a target evaporator temperature in the method of FIGS. 2 and 3.

The target evaporator temperature can be set as shown in FIG. 4, the target interior temperature is set by the user (S121). Next, interior and exterior temperatures of the vehicle and solar radiation are detected by using sensors 330, 340, 350 installed on the predetermined positions of the vehicle and input to the control unit 300 (S122). Then, a target discharge temperature of the vents 212, 214, 216 is calculated by using the target interior temperature, the interior and exterior temperatures of the vehicle and solar radiation (S124). Then, maximum evaporator temperature is input (S125). Then, target evaporator temperature is set (S127) by comparing the target discharge temperatures of the vents 212, 214, 216 with the maximum evaporator temperature (S126).

In the step of inputting the maximum evaporator temperature, it is preferable to calculate and input the maximum evaporator temperature as a function of the temperature of the air flowing into the evaporator at the minimum operation of the compressor.

In the step of comparing the target discharge temperature with the maximum evaporator temperature, it is preferable to set the target evaporator temperature to the target discharge temperature when the target discharge temperature is lower than the maximum evaporator temperature, and set the target evaporator temperature to the maximum evaporator temperature when the target discharge temperature is higher than the maximum evaporator temperature.

The step of calculating the target heat discharge quantity of each of vents 212, 214, 216 can be further added after the step of detecting and inputting interior and exterior temperatures of the vehicle and solar radiation by using sensors 330, 340, 350 installed on predetermined positions of the vehicle (S122), then target discharge temperatures of the vents 212, 214, 216 can be calculated (S124) in response to the target heat discharge quantity of the vents.

After calculating the target evaporator temperature, a determination of the high thermal load control or low thermal load control is made from the target heat discharge quantity (S130). The determination can be made based on appropriate standards. For example, high thermal load control can be selected when exterior temperature is higher than 30° C.

According to the preferred embodiment of the present invention, compulsive control of the control value on the pressure control valve 160 is made according to the amount of the thermal load firstly, and then normal control of the control value is carried out secondly. The detailed procedure is as follows.

Figure 5:
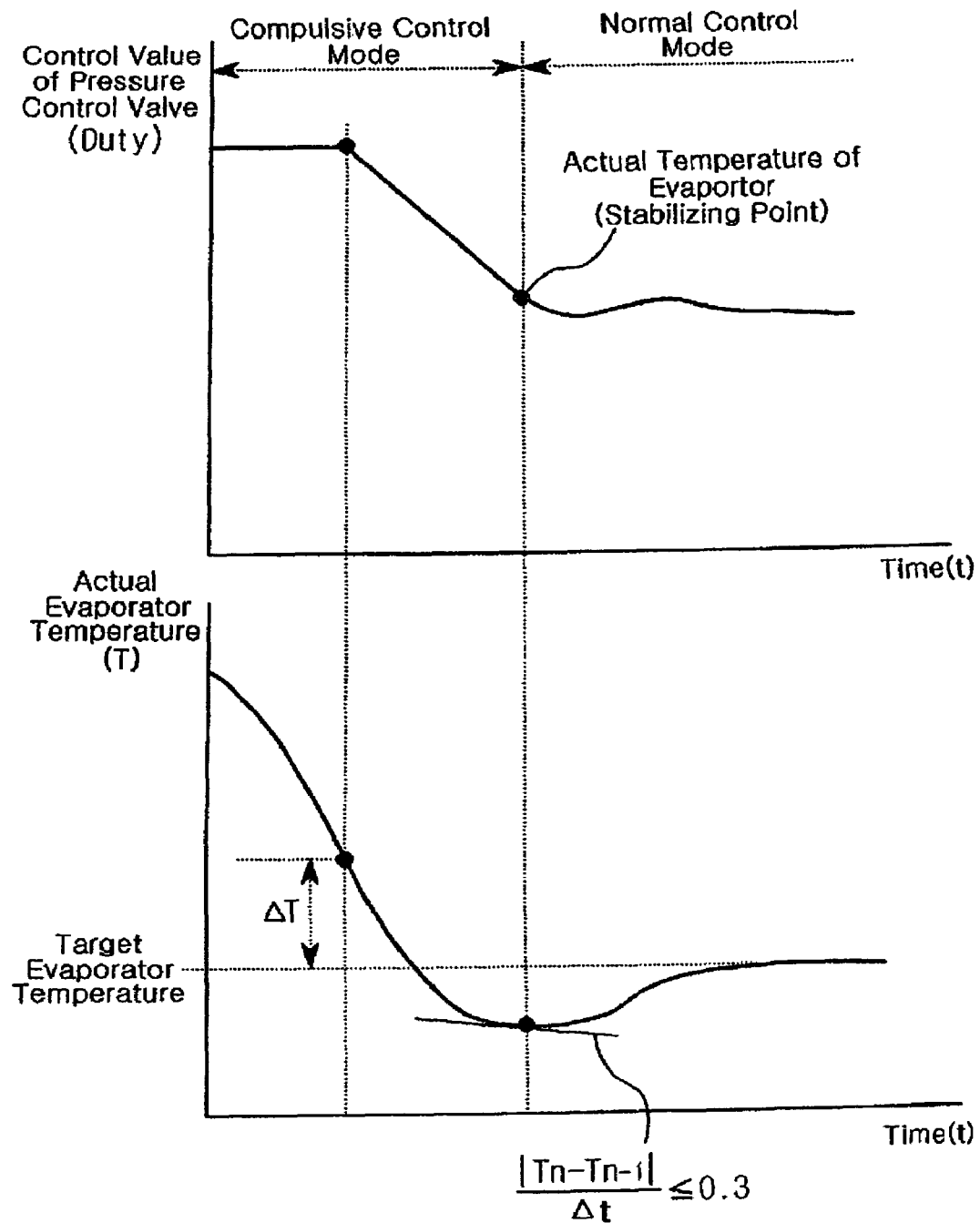
FIG. 5 is an illustration of the relation between control value of the pressure control valve and actual evaporator temperature at the mode of high thermal load control in the method of FIGS. 2 and 3.
Figure 6:
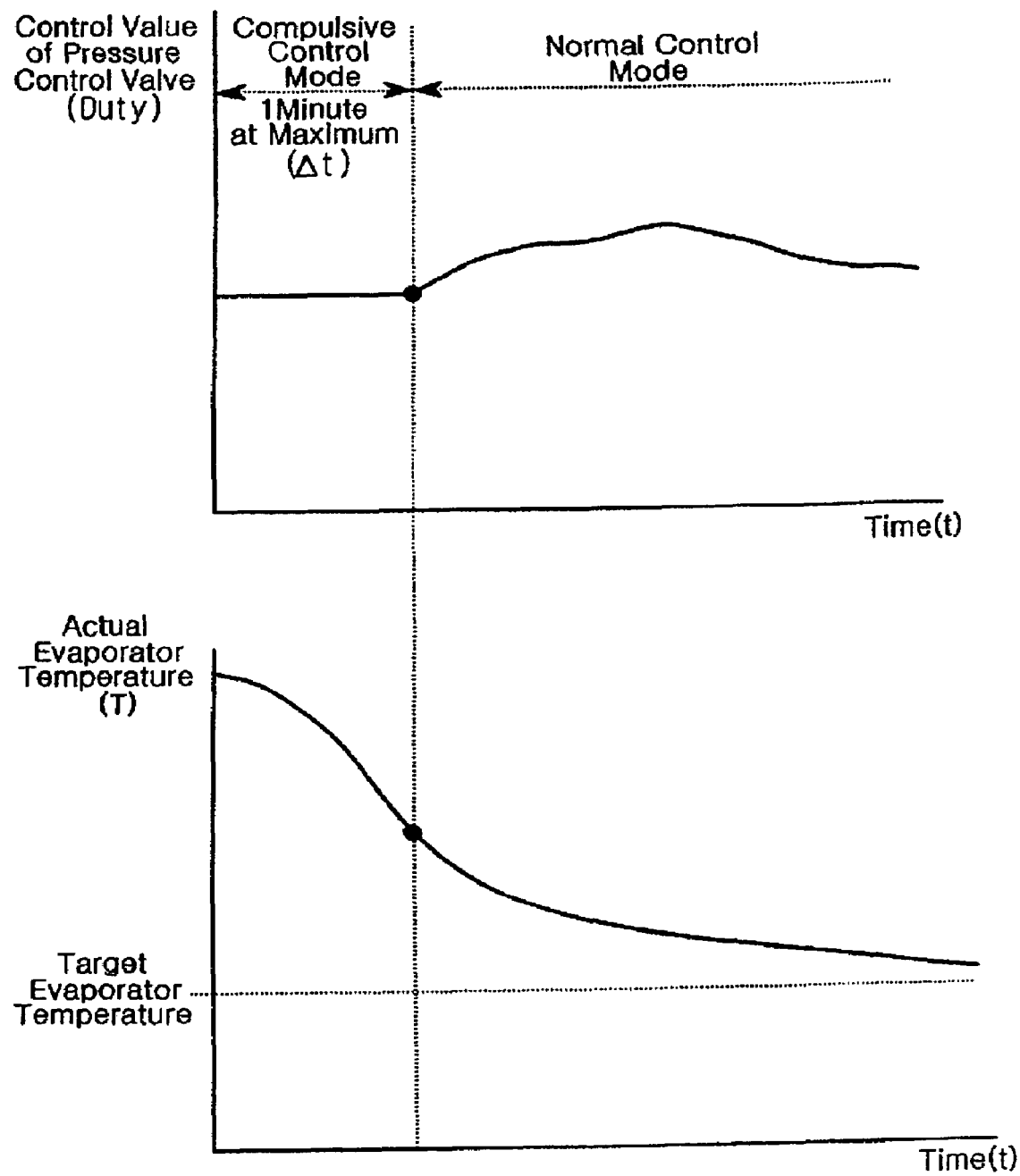
FIG. 6 is an illustration of the relation between control value of the pressure control valve and actual evaporator temperature at the mode of low thermal load control in the method of FIGS. 2 and 3.

In the case of high thermal load control, the control value on the pressure control valve 160 is set to a maximum value initially (S140) and decreased at a constant rate thereafter (S160) in the compulsive control mode, as shown in FIGS. 3 and 5.

The maximum value is, for example, 100 to 70%, and more preferably, 90 to 80%.

In addition, in the process of high thermal load control, determination is made based on whether the deviation between the target evaporator temperature and actual evaporator temperature is no larger than a predetermined value (S150). When the deviation between the target evaporator temperature and actual evaporator temperature is no larger than a predetermined temperature value (for example 5° C.) after the control value is kept at maximum value, it is desirable to decrease the control value at a constant rate.

The time of changing to the normal control mode from the compulsive control mode is preferably when the absolute value of the deviation between the actual evaporator temperature (Tn) and the previous actual evaporator temperature (Tn−1) is within a predetermined time interval (Δt, for example 2.7 seconds) which is no larger than a predetermined value (for example 0.3).

Also, the normal control mode is preferably proportional-integral (PI) control or proportional-integral-differential (PID) control.

The target evaporator temperature and an actual evaporator temperature can mean either the temperature of the air discharged through the evaporator or the temperature of the evaporator itself, and each can be selected as needed.

The reason why the control value on the pressure control valve 160 is kept at maximum value firstly and decreased with a constant rate with the compulsive control mode in the process of high thermal load control, and thereafter normal control mode is carried out under the state where the actual evaporator temperature is lower than the target evaporator temperature is that the actual evaporator temperature needs to reach the target evaporator temperature quickly considering cooling efficiency. When the time of starting the normal control mode is set when the actual evaporator temperature is higher than the target evaporator temperature in the process of high thermal load control, passengers can feel uncomfortable and it takes a longer time for the actual evaporator temperature to reach the target evaporator temperature.

Meanwhile, in the case of low thermal load control, the control value for the pressure control valve 160 is set to a minimum value and maintained at this value compulsively for a predetermined time in the compulsive control mode (S200), and then normal control mode is carried out by variably setting control coefficients according to the amount of thermal load (S180). The normal control mode is preferably carried out so that undershoot does not occur.

The time for maintaining the control value at the minimum value is preferably less than 1 minute. Also, the minimum value can be set to 0 to 40%, and more preferably, 30 to 40%.

In low thermal load control, additionally, the temperature of the cooling water can be measured further by cooling water sensor 360 in order to determine whether the cooling water temperature is no higher than a predetermined temperature (S210). When the temperature of the cooling water is no higher than the predetermined temperature, the opening rate of the temperature control door 240 is set to a maximum heating position (the position which closes the heating air passage) as shown in FIG. 2. In this way, the decrease in the temperature of the air due to the low cooling water temperature is prevented. When the temperature of the cooling water becomes higher than the predetermined temperature, the temperature control door 240 is set to a normal position.

By carrying out the low thermal load control as described above, the actual evaporator temperature needs to reach the target evaporator temperature stably without fluctuation. This can be carried out more efficiently through the control of the opening rate of the temperature control door 240.

Also, the normal control mode in the low thermal load control is preferably proportional-integral (PI) control or proportional-integral-differential (PID) control.

In the high low thermal load control and low thermal load control as described above, the control value which varies as a function of the amount of thermal load in the normal control mode, which is preferably proportional gain, integral gain or differential gain according to the type of the control. The control coefficients are preferably set to have a value proportional to the absolute value of the deviation between the target evaporator temperature and actual evaporator temperature, and are set to a maximum value when the absolute value of said temperature deviation is larger than a predetermined value.

INDUSTRIAL APPLICABILITY

According to the method of controlling air conditioner for vehicles which is constructed as described above, the control value of the pressure control valve 160 which controls the tilt angle of the swash-plate 144 by controlling the amount of refrigerant returning from the discharge chamber 134 to the crank chamber 122. By using the method of the present invention, actual evaporator temperature can reach the target evaporator temperature quickly at the initial stage of operation and temperature stability can be achieved to provide a convenient environment of vehicle operation.

What is claimed is:

1. A method of controlling an air conditioner for a vehicle, the method comprising the steps of:
    determining a target heat discharge quantity;
    determining a target evaporator temperature;
    determining whether there is to be a high thermal load compulsive control mode or a low thermal load compulsive control mode based on the determined target heat discharge quantity; and
    initially compulsively controlling a control value of a pressure control valve of a variable capacity compressor according to the amount of thermal load in the determined compulsive control mode, and thereafter normally controlling the control value in a normal control mode.

2. The method of claim 1, wherein, in the high thermal load compulsive control mode, said control value is set to a maximum value initially and decreased at a constant rate thereafter.

3. The method of claim 2, wherein said maximum value is 100 to 70%.

4. The method of claim 2, wherein said control value is decreased from an initially set maximum value at a constant rate in response to the deviation between the target evaporator temperature and actual evaporator temperature being no larger than a predetermined value in the compulsive control mode.

5. The method of claim 1, wherein the normal control mode is started when the absolute value of the deviation between the actual evaporator temperature and previous actual evaporator temperature is within a predetermined time interval no larger than a predetermined value.

6. The method of claim 1, wherein, in the low thermal load compulsive control mode, said control value is set to a minimum value and maintained for a predetermined time.

7. The method of claim 6, wherein said minimum value is 0 to 40%.

8. The method of claim 1, wherein said normal control on the pressure control valve is carried out through proportional-integral (PI) control or proportional-integral-differential (PID) control.

9. The method of claim 1, wherein said normal control mode is carried out by controlling said pressure control value by variably setting control coefficients according to the amount of thermal load.

10. The method of claim 9, wherein said control coefficients are set to have a value proportional to the absolute value of the deviation between the target evaporator temperature and actual evaporator temperature.

11. The method of claim 10, wherein said control coefficients are set to a maximum value when the absolute value of said temperature deviation is larger than predetermined value.

12. The method of claim 1, wherein the step of calculating the target evaporator temperature comprises:
setting target interior temperature of a vehicle by a user, detecting and inputting, to a controller, interior and exterior temperatures of the vehicle and solar radiation in response to sensors at predetermined positions of the vehicle, determining, in the controller, a target discharge temperature of the vent in response to the set target interior temperature, as well as interior and exterior temperatures of the vehicle and solar radiation, inputting, to the controller, the maximum evaporator temperature, determining, in the controller, the target evaporator temperature by comparing the target discharge temperature of the vent with the maximum evaporator temperature.

13. The method of claim 12, wherein the step of inputting, to the controller, the maximum evaporator temperature comprises determining and inputting the maximum evaporator temperature depending on the temperature of the air flowing into the evaporator at the minimum operation of the compressor.

14. The method of claim 12, wherein the target evaporator temperature is set to the target discharge temperature of a vent when the target discharge temperature of the vent is lower than the maximum evaporator temperature, and the target evaporator temperature is set to the maximum evaporator temperature when the target discharge temperature of the vent is higher than the maximum evaporator temperature.

15. The method of claim 12 further comprising the step of, in the controller, determining the target heat discharge quantity of the vent after the step of inputting interior and exterior temperature of the vehicle and solar radiation by using sensors at predetermined positions of the vehicle.

16. The method of claim 1, wherein the step of determining target heat discharge quantity is carried out, in a controller, by determining according to the target interior temperature of a vehicle set by a user, interior and exterior temperature of the vehicle and solar radiation input from the sensors at predetermined positions of the vehicle.

17. The method of claim 1, wherein in the case of low thermal load control, the method includes the steps of setting said control value to a minimum value, measuring the temperature of cooling water, determining, in a controller, whether the temperature of cooling water is no higher than a predetermined temperature, and when the temperature of cooling water is no higher than the predetermined temperature, an opening rate of a temperature control door is set to a maximum heating position.

* * * * *